Figure 3A:
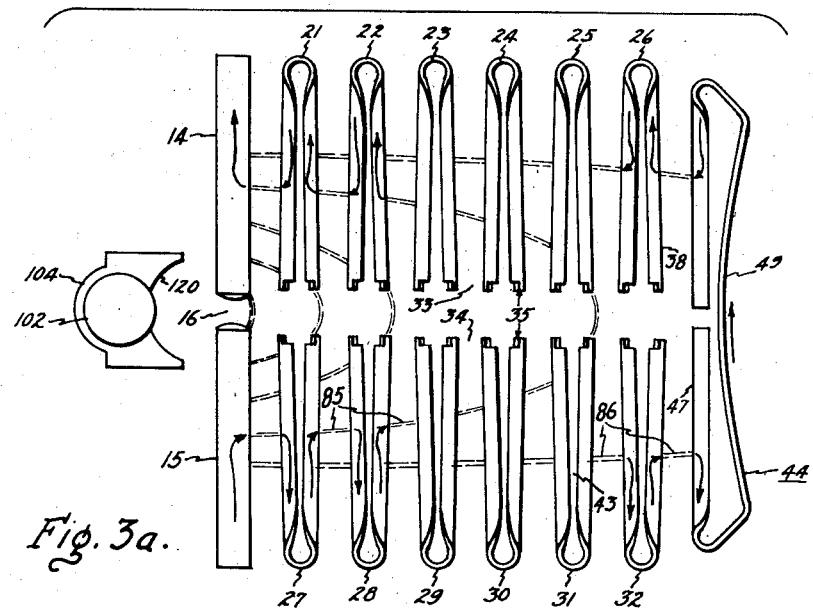

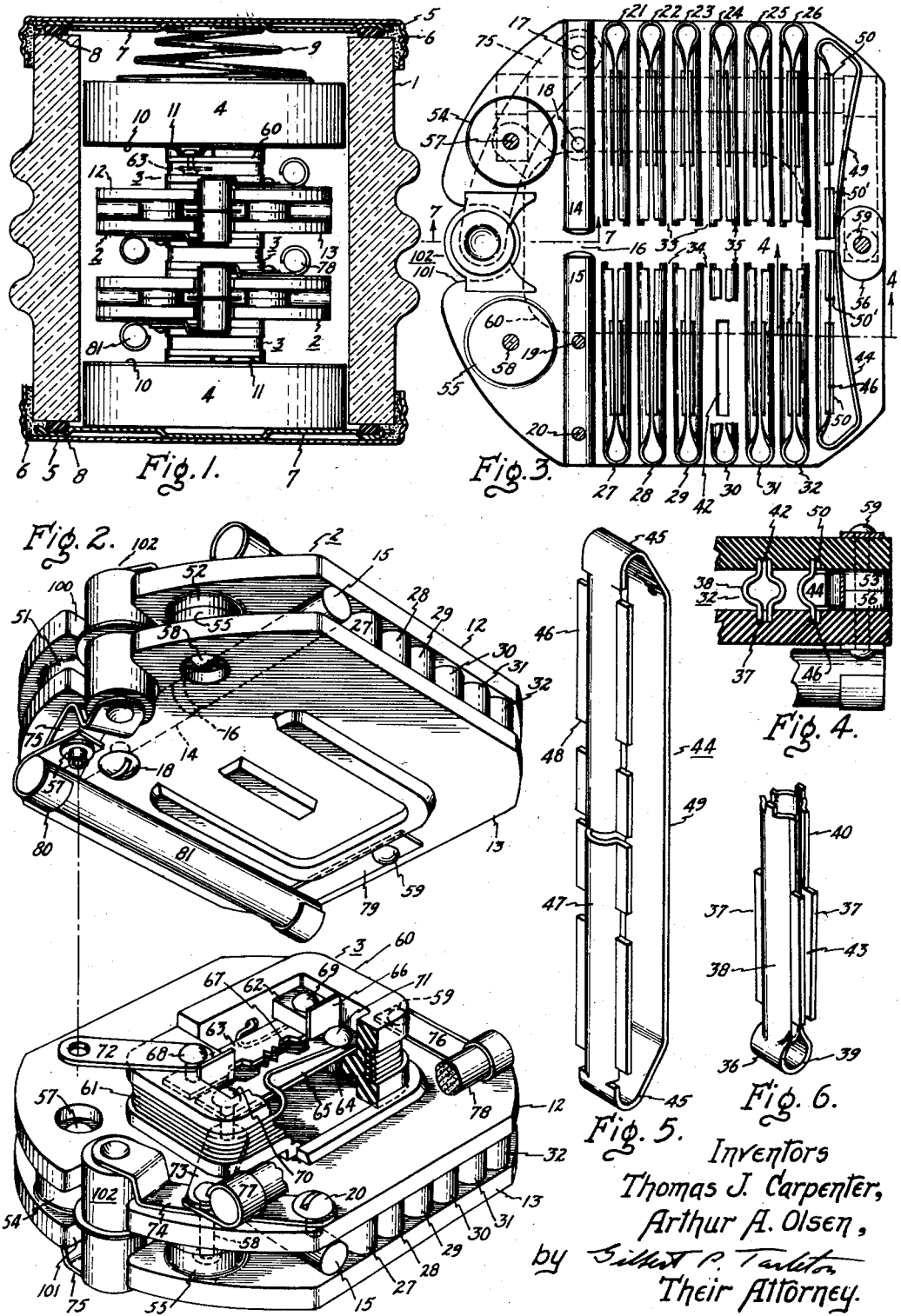

Inventors
Thomas J. Carpenter,
Arthur A. Olsen,
by Gilbert P Tarleton
Their Attorney.

June 9, 1959 T. J. CARPENTER ET AL 2,890,389
LIGHTNING ARRESTER IMPROVEMENTS
Filed March 24, 1955 4 Sheets-Sheet 3
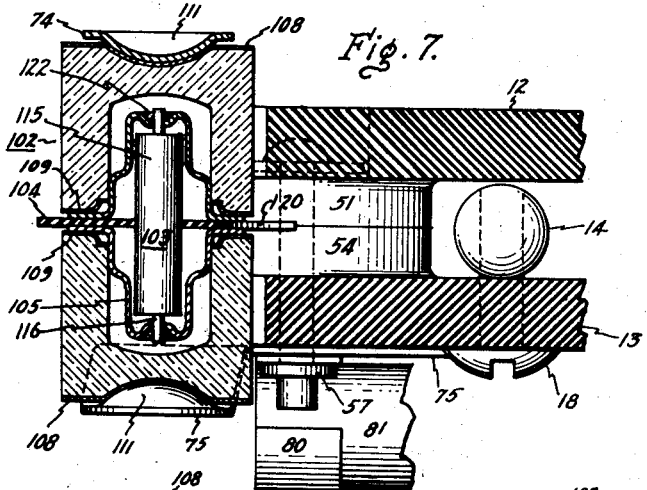
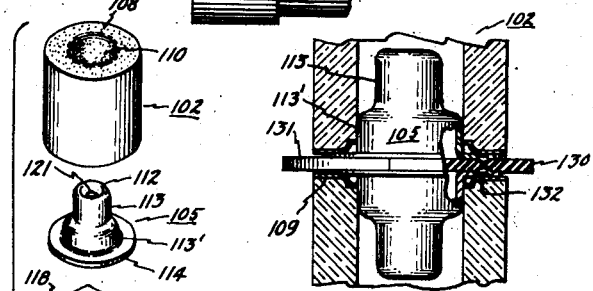
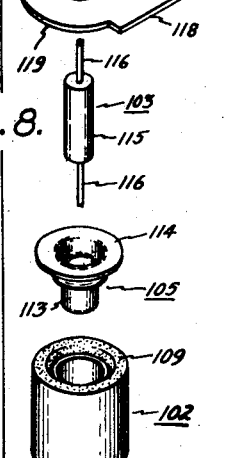
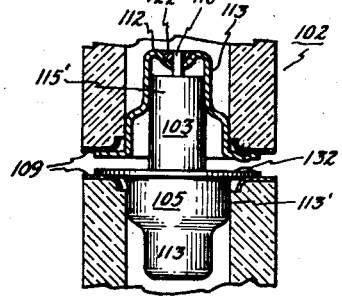
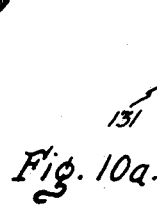
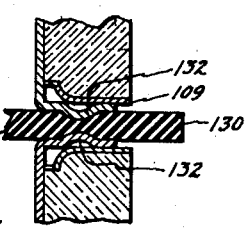
Inventors
Thomas J. Carpenter,
Arthur A. Olsen,
by Gilbert P. Tarleton
Their Attorney.

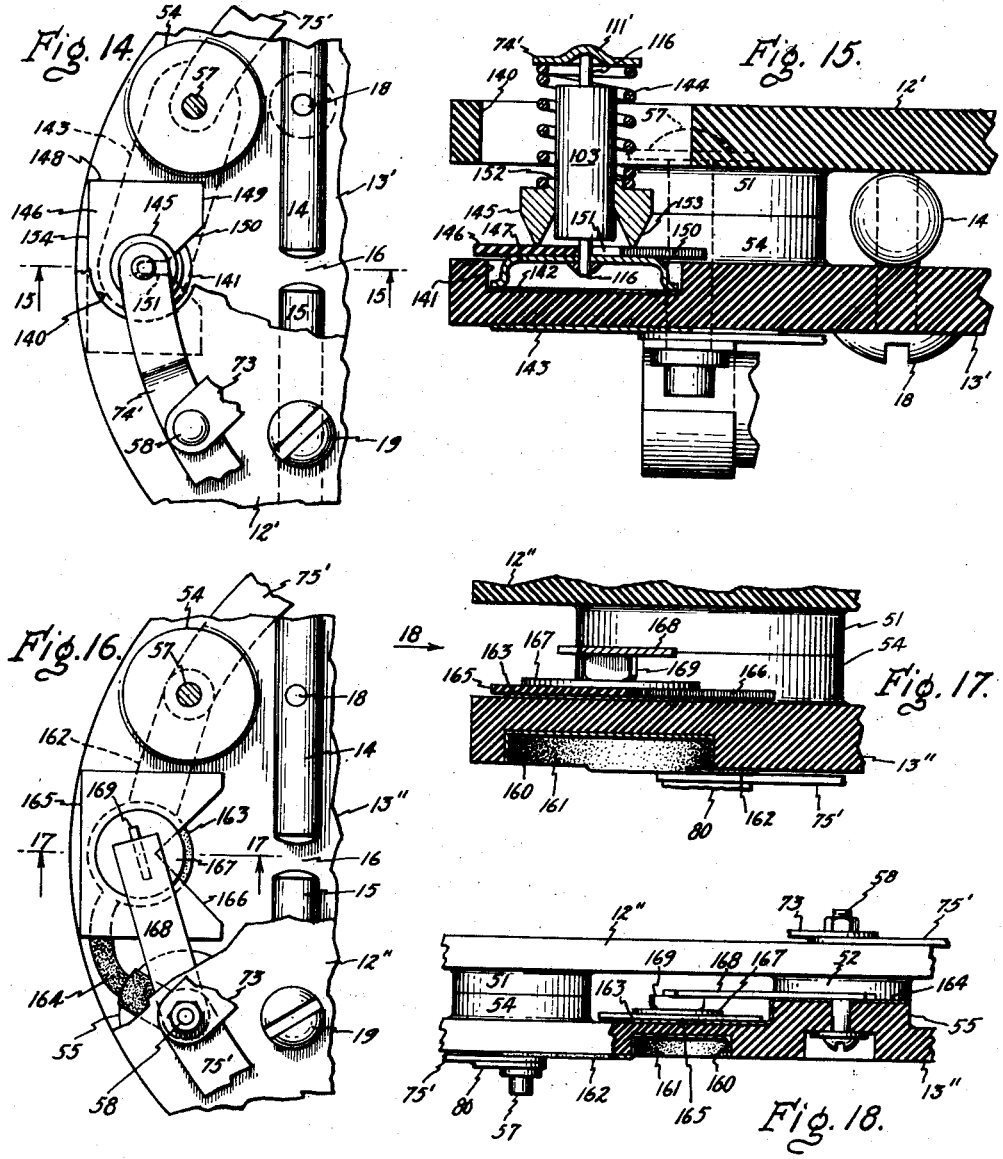

United States Patent Office 2,890,389
Patented June 9, 1959

2,890,389

LIGHTNING ARRESTER IMPROVEMENTS

Thomas J. Carpenter and Arthur A. Olsen, Pittsfield, Mass., assignors to General Electric Company, a corporation of New York Application March 24, 1955, Serial No. 496,442

17 Claims. (Cl. 317—70)

This invention relates to a voltage limiting device or lightning arrester, and more particularly, to improvements in a voltage limiting device or lightning arrester of the type shown in Olsen and Skeats Patent 2,644,116, issued June 30, 1953, and assigned to the same assignee as the instant patent application.

In said Patent 2,644,116 is shown a gap structure comprising two main electrodes and a plurality of auxiliary electrodes. Each of the auxiliary electrodes comprises two metallic strips. Each of the metallic strips has a lengthwise extending corrugation formed therein between its opposite lengthwise extending edges. The two metallic strips are positioned opposite to each other and disposed therebetween is an electrical insulating material strip extending from one end of the two oppositively positioned metallic strips towards but short of the other end thereof. At said other end the two oppositively positioned metallic strips are mechanically and electrically connected together as by welding. One purpose of such an auxiliary electrode construction is to reinforce the reverse magnetic field of the magnetic coil used in conjunction with the gap structure. Said auxiliary electrode construction and reverse field reinforcing is more fully described in said Patent 2,644,116 in conjunction with Figs. 8 and 9 thereof.

It is an object of this invention to provide an improved and simplified low cost auxiliary electrode construction which can be easily assembled.

In our invention our auxiliary electrode can be formed on a punch press and may comprise a single continuous metallic strip, such as an aluminum strip, which is bent into a narrow U-shaped configuration at its central portion. The bent central portion comprises the outer end of the auxiliary electrode. Each of the two oppositively disposed legs of said U-shaped configuration has a lengthwise extending corrugation or depression formed therein between its lengthwise extending edges. Said corrugations extend from the outer end of the auxiliary electrode to its inner end. As will be obvious to those skilled in the art the metallic strip, such as an aluminum strip, will have an oxide film formed thereon due to oxidation. Such oxide film provides the necessary electrical insulation between said two oppositively disposed legs even though they may make contact with each other. Thus, no special insulation is required as in said Patent 2,644,116 and said legs may or may not be spaced from each other by an air gap since the necessary electrical insulation is provided by the oxide film.

In said Patent 2,644,116 to prohibit the electrical arc from being forced out of the gap unit an additional auxiliary electrode is used. Said additional auxiliary electrode has a configuration equivalent to one of the previously mentioned two metallic strips but is about twice as long. The construction of said additional auxiliary electrode is probably best shown in Figs. 5 and 6 of said Patent 2,644,116. Said additional auxiliary electrode does not substantially contribute to the reinforcement of the reverse magnetic field of the magnetic coil used in conjunction with the gap unit.

Accordingly, it is a further object of this invention to provide an additional auxiliary electrode which substantially reinforces the reverse magnetic field of the magnetic coil used in conjunction with the gap unit.

Our additional auxiliary electrode may comprise a single continuous metallic strip, such as an aluminum strip, whose opposite end portions are bent over towards each other at portions disposed along about ¼ and ¾ of the total length of the strip. Said opposite end portions are each disposed generally parallel to and may be spaced by an air gap from the portion of said strip disposed between said ¼ and ¾ portions. However, said air gap is not entirely necessary due to the oxide film formed on the strip as heretofore discussed with respect to our other auxiliary electrode. Each of said opposite end portions has a lengthwise extending corrugation or furrow formed therein between the lengthwise extending edges thereof, and the opposite ends of said continuous strip are spaced from each other by an air gap.

Additionally, in said Patent 2,644,116 the parts are so arranged whereby current enters the gap unit at an inner end of one of the main electrodes and leaves the gap unit at an inner end of the other main electrode, as at terminals 35 and 36 respectively shown in Fig. 7 of said Patent 2,644,116.

It is a further object of this invention to so arrange said parts whereby current enters and leaves the gap unit at the outer ends of the main electrodes since such an orientation contributes to reinforcement of the reverse magnetic field of the magnetic coil used in conjunction with the gap unit.

To obtain consistent sparkover of a lightning arrester main spark gap under transient voltage conditions it is well known to preionize said main spark gap by a main spark gap preionizing device. Said preionizing device is adjusted to give a low corona level as indicated by radio noise measurements at normal system voltage and frequency. Low corona level at normal system voltage and frequency is necessary to minimize radio noise interference and corrosion of the lightning arrester elements.

In said Patent 2,644,116 the preionizing device comprises a button or tip directly electrically connected to one of the main electrodes and capacitively coupled to the other main electrode. Said capacitive coupling is accomplished by spring biasing said button or tip against the inner surface of one of the electrical insulating material plates which house and retain the main and auxiliary electrodes in place. Said button or tip bears against said inner surface at a point opposite the main spark gap. A corona discharge occurs at said button or tip and said corona discharge ionizes the air or gas in which said corona discharge occurs furnishing free electrons which radiate into the main spark gap to cause it to spark over at a consistent and predictable low voltage. In general the voltage at which a lightning arrester may be set to spark over or start operating is determined by the generated voltage of the system to which the protected apparatus and circuits as well as the lightning arrester are applied. In other words a lightning arrester must work rapidly when a transient or surge voltage exceeding a certain threshold value is applied to its terminals, but it must not operate on harmless system overvoltages which approach but do not exceed this threshold value. In the form of preionizing device shown in said Patent 2,644,116 and probably best illustrated in Figs. 4 and 5 thereof, the preionizing device can be adjusted to give low and consistent sparkover voltage and substantially no radio noise interference by varying the configuration of the button or tip and by adjustment of the place of contact of the button or tip with the inner surface of one of the electrical insulating material plates. However, due to the nature of the preionizing device and rather wide manufacturing tolerances the preionizing device must be carefully adjusted.

Accordingly, it is a further object of this invention to provide an improved preionizing device whose adjustment can be readily controlled.

In one form of our invention the preionizing means is made with special individual electrical circuit components which can be standardized to close manufacturing tolerances. Furthermore, said individual components can be readily preassembled and uniquely inserted into the gap unit substantially without any further adjustment.

Another prior art main spark gap preionizing device takes the form of two electrodes spaced from each other by an electrical insulating material. We have found that the sparkover consistency of such form of preionizing device is satisfactory for transient conditions in which sparkover occurs in about one microsecond. However, for sparkovers occurring at about ten microseconds the sparkover deviation may be as much as 30% from the average value.

Accordingly, it is a further object of this invention to provide a frequency sensitive preionization device having improved sparkover consistency.

In one form of our frequency sensitive preionization device an electrically parallel connected arc producing preionizing air spark gap, a corona producing preionizing insulated gap, and a resistor are electrically series connected to both of the main spark gap electrodes. The series connection to at least one of the main electrodes is through a capacitor. In this one form of our invention the voltage across the corona producing preionizing insulated gap in parallel with the resistor can be considerably less than the voltage required to produce corona at 60 cycle frequency whereby there is substantially no radio noise interference prior to operation of the lightning arrester. At higher frequencies the reactance of the capacitor decreases and the voltage across the resistor and corona producing insulated gap increases as a function of frequency. Corona emitted by the corona producing preionizing insulated gap preionizes the arc producing preionizing air spark gap. When the arc producing preionizing air spark gap breaks down it will preionize the main spark gap and cause it to arc over. It will be understood that this sequence occurs almost instantaneously. Preionization of the main spark gap by the arc producing preionizing air spark gap gives more consistent sparkover of the main spark gap because an arc discharge produces more copious quantities of free electrons which radiate into the main spark gap. That is, an arc discharge is more efficient in producing preionization of a main spark gap than a corona discharge.

In other forms of our frequency sensitive preionization device either the arc producing preionizing air spark gap or the corona producing preionizing insulated gap is omitted. In the latter case the advantage of an arc discharge is obtained, and in both cases very sensitive frequency response is obtained due to the series connection to at least one of the main spark gap electrodes through a capacitor.

The features of our invention which we believe to be novel are set forth with particularity in the appended claims. Our invention itself, however, both as to its organization and method of operation, together with further objects and advantages thereof, may best be understood by reference to the following description taken in connection with the accompanying drawings.

In the drawings, Fig. 1 is a partly broken away elevational view of an enclosed valve type lightning arrester embodying our invention. Fig. 2 is an exploded perspective view of the two gap units and central magnetic coil unit of Fig. 1. Fig. 3 is a top view of the lower gap unit of Fig. 2 with the upper electrical insulating material plate thereof removed. Fig. 3a is a diagrammatic illustration of the manner of elongation and subdivision of the initial arc and the manner of reinforcement of the reverse magnetic field of the magnetic coil units. Fig. 4 is a sectional view of the lower gap unit taken along the line 4—4 of Fig. 3 with the upper electrical insulating material plate replaced. Fig. 5 is a perspective view of our additional auxiliary electrode. Fig. 6 is a perspective view of one of the plurality of shorter auxiliary electrodes. Fig. 7 is a sectional view of the lower gap unit taken along the line 7—7 of Fig. 3 to better show the preionizing device thereof. Fig. 8 is an exploded perspective view of said preionizing device. Fig. 9 is a diagrammatic electrical circuit illustration of said preionizing device of the lower gap unit. Fig. 10 is a partly sectional view of another form of preionizing device. Fig. 10a is an enlarged sectional view of a portion of Fig. 10 to better show the details thereof. Fig. 11 is a diagrammatic electrical circuit illustration of the preionizing means of Fig. 10. Fig. 12 is a partly sectional view of another form of preionizing device. Fig. 13 is a diagrammatic electrical circuit illustration of the preionizing means of Fig. 12. Fig. 14 is a broken away top view of another gap unit showing still another form of preionizing device. Fig. 15 is a sectional view of the gap unit of Fig. 14 taken along the line 15—15 of Fig. 14 to better show the preionizing device thereof. Fig. 16 is a broken away top view of still another gap unit showing still another form of preionizing device. Fig. 17 is a sectional view of the gap unit of Fig. 16 taken along the line 17—17 of Fig. 16. Fig. 18 is a side view of the preionizing device of Figs. 16 and 17 when viewed in the direction of arrow 18 of Fig. 17. The equivalent electrical circuit for the preionizing devices of Figs. 14 and 15 and Figs. 16 to 18 is identical to the electrical circuit shown in Fig. 9. Like reference numerals will be used throughout the various figures to indicate identical parts.

Referring now to the drawings, and more particularly to Fig. 1, shown therein is a valve type lightning arrester comprising a closed porcelain or other electrical insulating material housing 1 having two gap units 2, three magnetic coil units 3, and two valve units 4 therein. The gap units 2 and magnetic coil units 3 are alternately stacked with each other, and the valve units 4 are positioned at the top and bottom of said stacked gap and coil units. Both ends of housing 1 are closed by metallic cup-shaped members 5 sealed to housing 1 by cement 6 or the like. Interposed between the cup-shaped members 5 and the ends of housing 1 are metallic plates 7, and interposed between metallic plates 7 and the end edges of housing 1 are compressed rubber or the like sealing gaskets 8. The cup-shaped members 5 are in electrical contact with the plates 7, and interposed between the upper plate 7 and the upper valve unit 4 is a compressed metallic spring 9.

As is well known in the art the number of gap, coil, and valve units can be increased or decreased from the number shown in Fig. 1. The valve units 4 employ what is generally termed as valve material, such as non-linear resistance material, to limit the follow power current. Such material has characteristics whereby its impedance changes in accordance with the voltage applied. For high voltages said impedance is relatively low, whereas for low voltages said impedance is fairly high, thereby acting as a valve to shut off the 60 cycle follow power current following a break-down of the gap units 2. One of the cups 5 is connected to a not shown electrical apparatus, circuit, or source of power to be protected and the other cup 5 is connected to a not shown ground. The compressed spring 9 ensures good electrical contact between the stacked gap, coil, and valve units and the plates 7. The stacked gap, coil, and valve units are electrically connected in series. Good electrical contact between the valve units 4 and the upper and lower coil units 3 is ensured by virtue of metallic plates or coatings 10 on the valve units 4 and metallic plates 11 on said upper and lower coil units 3. The manner of making electrical contact between all of the coil units 3 and the gap units 2 will be illustrated in greater detail hereinafter. It is the function of the protective device shown in Fig. 1 to prevent the voltage across said protected electrical apparatus, circuit, or source of power and ground from rising to an abnormally high and dangerous value. When a transient having components with rapid rates of voltage rise is applied across the protective device of Fig. 1 the valve units 4 will present a relatively low impedance, the gap units 2 will break down, and said transient will be dissipated to ground. Following breakdown of the gap units 2 the normal power current will follow said transient to ground. However, after said transient has been dissipated to ground the valve units 4 will present a relatively high impedance and the magnetic fields of the coil units 3 will react with the magnetic fields of the follow power current electrical arcs existent in the gap units 2 whereby said follow power current will be interrupted.

Referring now to Figs. 2 to 6, it will be seen that each of the gap units 2 comprises two identical electrical insulating material plates or slabs 12 and 13 spaced with respect to each other. Between the slabs 12 and 13 are positioned two circular cross sectioned main electrodes 14 and 15 defining a main spark gap 16 therebetween adjacent their inner ends. The main electrodes 14 and 15 are connected to the slabs 12 and 13 by bolts 17 to 20. The bolts 17 and 18 pass only through slab 13 and electrode 14, and bolts 19 and 20 pass only through slab 12 and electrode 15. It is to be noted that the two gap units 2 are identically constructed so what is said with respect to one of them applies equally well to the other.

The main electrodes 14 and 15 are aligned with respect to each other along an identical imaginary straight line, and disposed along a same side of the electrodes 14 and 15 are a plurality of auxiliary electrodes having a length about equal to that of the main electrodes 14 and 15. For instance, disposed on the right-hand side of electrode 14 when viewing Fig. 3 are auxiliary electrodes 21 to 26, and disposed on the right-hand side of electrode 15 are auxiliary electrodes 27 to 32. The electrodes 21 to 26 are parallel to and spaced from each other as well as electrode 14 and define therebetween a plurality of auxiliary spark gaps 33 which extend transverse to the main spark gap 16. The electrodes 27 to 32 are parallel to and spaced from each other as well as electrode 15 and define therebetween a plurality of auxiliary spark gaps 34 which also extend transverse to the main spark gap 16. Additionally, the electrodes 21 to 26 are aligned along identical imaginary straight lines with the electrodes 27 to 32 respectively and define therebetween adjacent their opposite inner ends a plurality of auxiliary spark gaps 35 which extend parallel to the main spark gap 16. Both of the main electrodes and all of the auxiliary electrodes 21 to 32 of each gap unit 2 are disposed in an identical plane. Also, all of the auxiliary electrodes 21 to 32 have an identical construction which will now be described.

Referring specifically to Fig. 6, it will be seen that each of the auxiliary electrodes 21 to 32 comprises a continuous single relatively resilient strip of metal bent at its central portion 36 into a narrow U-shaped configuration. Formed between the lengthwise extending side edges or flanges 37 of each leg of the U-shaped configuration is a lengthwise extending corrugation or depression 38. In each auxiliary electrode the concave surfaces of the depressed portions 38 face each other while the convex surfaces thereof face in opposite directions. Along the central portion 36 and the inner ends of the auxiliary electrode the lengthwise extending edges 37 thereof are cut away as indicated by notches 39 and 40 respectively. Slots 42, see Figs. 3 and 4, formed in the opposite inner surfaces of the slabs 12 and 13 receive the lengthwise extending side edges 37. That is, in the illustrated embodiment of the invention twelve of said slots 42 are formed in each of the slabs 12 and 13, each of said slots 42 receiving two lengthwise extending side edges 37. Said slots 42 have a length equal to the length of the edges 37 whereby there will be no lengthwise slippage or movement of the auxiliary electrodes with respect to the insulating slabs 12 and 13. Also, said slots 42 have a predetermined width slightly greater than twice the width of a lengthwise extending side edge 37 whereby after a pair of side edges 37 are pinched together and inserted into a slot 42 said pair of side edges 37 will spring apart slightly as illustrated by air gap 43 to retain themselves within said notch 42. The depth of the side edges 37 is greater than the depth of the notches 42 whereby the corrugated portions 38 are spaced from the opposite inner surfaces of the slabs 12 and 13. Because of the described configuration of the auxiliary electrodes and slots 42 the creepage distance over the surface of the insulating plates 12 and 13 between adjacent electrodes is relatively long. Also, the configuration of the auxiliary electrodes ensures that arcing therebetween will occur at corrugations 38 which represent the shortest distance of travel therebetween instead of along the inner surfaces of the slabs 12 and 13.

To prohibit the electrical arc established within the gap units 2 from escaping therefrom a last auxiliary electrode 44 having a length of about twice that of any of the main or auxiliary electrodes 14 and 15 and 21 to 32 respectively is positioned on the right-hand side of electrodes 26 and 32 and spaced therefrom to define auxiliary spark gaps 33 and 34 respectively therebetween. As seen more clearly from Fig. 5, the electrode 44 comprises a single continuous strip of metal. The opposite ends of said strip are bent over towards each other at portions 45 disposed at about ¼ and ¾ of the total length of said strip. Formed between the lengthwise extending side edges or flanges 46 of said opposite ends is a lengthwise extending corrugation or furrow 47. Intermediate the length of the corrugated portions 47 the lengthwise extending side edges 46 are cut away as indicated by notches 48. The side edges 46 are also cut away along the bent portions 45 and the central portion 49 disposed between bent portions 45. As seen from Figs. 3 and 4, notches 50 similar to notches 42 are formed in slabs 12 and 13 to receive the outer portions of the side edges 46, and notches 50' are also formed in slabs 12 and 13 to receive the inner portions of the side edges 46, said inner and outer side edge portions being separated by notches 48.

Formed on the inner surfaces of the slabs 12 and 13 are integral bosses 51 to 53 and 54 to 56 respectively. Bosses 51 and 54 are positioned adjacent electrode 14, with rivet or bolt 57 extending therethrough, bosses 52 and 55 are located near electrode 15 with rivet or bolt 58 passing therethrough, and bosses 53 and 56 are positioned outside of the electrode 44 and have rivet or bolt 59 extending therethrough. Said bosses 51 to 56 retain the slabs 12 and 13 spaced from each other by a predetermined distance, and the rivets or bolts 57 to 59 clamp the slabs 12 and 13 together. The electrode 44 is positioned between electrodes 26 and 32 and bosses 53 and 56. The innermost opposite ends of the continuous strip of the electrode 44 are spaced from each other, and the opposite ends of the electrode 44 comprising the portions 46 and 47 are spaced from the central portion 49, although as will be more clear hereinafter, the latter mentioned spacing is not absolutely necessary.

In the illustrated embodiment of the invention magnetic coil units 3 are positioned on opposite sides of the gap units 2. All of the coil units 3 are identically constructed and a detailed description of any one of the coil units 3 applies equally well to the other coil units 3. As best seen from Fig. 2, each of the coil units 3 comprises an annular or rectangular electrical insulating material spool 60 having an electrical coil 61 wound thereabout. Positioned within and on one side of the spool 60 are two integral ledges 62 which support a metallic plate 63, and positioned within and on the other side of the spool 60 are two other integral ledges 64 which support a metallic plate 65. The two metallic plates 63 and 65 are spaced from each other by two electrical insulating material strips 66 whereby an air gap 67 is defined between the spaced inner edges of the plates 63 and 65 adjacent the central portion thereof. The plate 63 is fastened to the ledges 62 by bolts or rivets 68 and 69 and the plate 65 is fastened to the ledges 64 by bolts or rivets 70 and 71. The bolts or rivets 68 and 70 have metallic straps 72 and 73 respectively connected thereto, and opposite ends of the electrical coil 61 are connected to the bolts or rivets 69 and 71.

Superposed with respect to the outer surfaces of the slabs 12 and connected to the bolts 20 and 58 are metallic straps 74, and superposed with respect to the outer surfaces of the slabs 13 and connected to the bolts 17 and 57 are metallic straps 75. The inner ends of the straps 74 and 75 extend toward each other and position the main spark gap preionizing means in a manner to be described hereinafter.

Superposed with respect to the outer surface of slabs 12 and electrically connected to the bolts 59 and 58 are metallic straps 76 and 77 respectively which support a grading resistor 78, and superposed with respect to the outer surface of slabs 13 and electrically connected to the bolts 59 and 57 are metallic straps 79 and 80 respectively which support another grading resistor 81. Thus, a pair of series connected grading resistors 78 and 81 are connected in shunt relationship with the main pair of electrodes 14 and 15 of each gap unit 2.

The outer ends of the straps 72 are electrically connected to the bolts 57 and the outer ends of the straps 73 are electrically connected to the bolts 58 whereby all of the alternately stacked coil and gap units illustrated in Fig. 1 are connected electrically in series. As heretofore described, the uppermost and lowermost coil units 3 of Fig. 1 make electrical contact with the upper and lower valve elements 4 respectively by virtue of contact plates 11. That is, the uppermost coil unit 3 does not have a strap 72, but a plate 11 which is electrically connected to the bolt 68 thereof; and the lowermost coil unit 3 does not have a strap 73, but a plate 11 which is electrically connected to the bolt 70 thereof.

When a lightning surge is impressed across the lightning arrester unit of Fig. 1, the main spark gaps 16 of the gap units 2 will arc over. For instance, the path of travel of such surge through the alternately stacked gap and coil units will be from the bolt 57 of the upper gap unit of Fig. 2 to strap 72, bolt 68, plate 63, bolt 69, coil 61, bolt 71, plate 65, bolt 70, and strap 73 of the coil unit of Fig. 2. From strap 73 said path of travel progresses through bolt 58, strap 74, bolt 20, electrode 15, spark gap 16, electrode 14, bolt 17, strap 75, and bolt 57 of the lower gap unit of Fig. 2. After the main spark gap 16 arcs over, since said surge includes components with rapid rates of change of current, gap 67 will arc over, after which current flow will be through gap 67 rather than through coil 61. Coil 61 is electrically in series with electrode 15, gap 16, and electrode 14, and the gap 67 provides a bypass or shunt around the coil 61 for its protection during the passage of a transient having components with rapid rates of current change. After said transient has been dissipated to ground power current may follow the same path. However, this follow power current, which would not include components with rapid rates of change, would follow the path of lower impedance through coil 61 rather than through gap 67 whereby the arc across gap 67 is extinguished.

Follow power current flow through the coil 61 creates a magnetic field within the periphery of the coil 61. Said magnetic field will react with the magnetic field produced by the current of the main arc across gap 16 on a motor principle to move the initial arc into the vicinity of the auxiliary electrodes. When the initial arc moves into the vicinity of the auxiliary electrodes, it will be fanned out across the auxiliary electrodes and be broken up into a plurality of arcs in the manner illustrated by the broken lines of Fig. 3a. The arcs are moved progressively by the internal magnetic field of coil 61 towards the outer ends of the auxiliary electrodes where they would tend to reunite or recombine into a single long arc. However, since the auxiliary electrodes extend for a substantial distance beyond the outer periphery of winding 61, the return magnetic field of the winding 61 will exert a force on the arcs tending to force them back toward the inner ends of the auxiliary electrodes. The progression of the arcs towards the outer ends of the auxiliary electrodes will be arrested at points some distance short of said outer ends.

Also, due to the fact that current enters the electrode 15 and leaves the electrode 14 at the outer ends thereof respectively, as well as the particular configuration of the auxiliary electrodes 21 to 32 and 44, the reverse magnetic field of the coil 61 is reinforced to aid in arresting movement of the arcs towards the outer ends of the electrodes where they could reunite into a single long arc. For instance, referring particularly to Fig. 3a and the series of broken line arcs 85 thereof, it will be noted that in accordance with the current arrow along electrode 15 current passes from the outer end of electrode 15 towards the inner end thereof and then across the first of the series arcs 85 from electrode 15 to the left-hand leg of electrode 27.

Then current flow is outwardly along the left-hand leg of electrode 27 around the bent portion thereof inwardly along the right-hand leg thereof (as indicated by the current arrows along electrode 27) to the second of the series arcs 85. From the second of the series arcs 85 current flows around the bent portion of electrode 28 to the third of the series arcs 85 and so on. Such scalloped or crenelated current path along the electrodes and series arcs comprises a plurality of current loops whose magnetic fields reinforce the return magnetic field of coil 61 to arrest outward movement of the plurality of arcs. In the heretofore discussed Patent 2,644,116 the direction of current flow in the main electrodes is opposite to that illustrated in Fig. 3a. In our invention we reverse the direction of current flow in the main electrodes from that shown in said Patent 2,644,116 whereby current flow in the main electrodes contributes towards reinforcement of the return magnetic field of the magnetic coil whose function is to arrest outward movement of the plurality of arcs.

Additional reinforcement of the reverse magnetic field of the magnetic coil is obtained by virtue of the particular configuration of the last auxiliary electrode 44. For instance, in the series of arcs 86 current flows around the bent portion of electrode 32 across the last lower right-hand arc of the series arcs 86 to the electrode 44. However, instead of current now flowing inwardly of electrode 44 to the last upper right-hand arc of the series arcs 86, which is the case in said Patent 2,644,116, in our invention current flow is around the lower bent portion of electrode 44, across the back portion 49 of electrode 44, and then around the upper bent portion of electrode 44 to the last upper right-hand arc of the series arcs 86. Thus, in our invention the last auxiliary electrode provides current loops for reinforcing the reverse magnetic field of the magnetic coil not provided by said Patent 2,644,116.

As heretofore described, after the side edges 37 of the plurality of electrodes 21 to 32 are positioned within the notches 42 they will spring apart somewhat as illustrated by air spaces 43 to retain themselves within the notches 42. Similarly, after the auxiliary electrode 44 is located in the position illustrated in Fig. 3 the ends thereof comprising side edges 46 will spring away from the central portion 49 thereof and have air spaces therebetween. Although such arrangement is desirable from a mechanical point of view to facilitate assembly of the auxiliary electrodes 21 to 32 and 44 by having a minimum of falling parts, said air spaces of the auxiliary electrodes 21 to 32 and 44 are not absolutely essential for the successful formation of current loops to reinforce the reverse magnetic fields of the coils 61. Since the electrodes 21 to 32 and 44 are made from metal, such as aluminum, an oxide film, such as aluminum oxide, will be formed thereon due to atmospheric oxidation. Such oxide film has been found to provide the necessary electrical insulation, as between the legs of the electrodes 21 to 32 and between the ends and central portions of electrode 44 to ensure the formation of said current loops even though the legs of the electrodes 21 to 32 and the ends and central portions of electrode 44 make contact with each other. For instance, even though there were no air spaces 43 between the side edges 37 of the auxiliary electrodes 21 to 32 current would still flow outwardly of one leg thereof about the central portion thereof and then inwardly of the other leg thereof in the manner illustrated in Fig. 3a due to said oxide film. Accordingly, it is within the scope of this invention to ensure the formation of current loops in the auxiliary electrodes solely by the utilization of oxide films.

Referring now also to Figs. 7 to 9 for a description of one form of our main spark gap preionizing means, it will be noted that in the left-hand edge of the slabs 12 and 13 and centrally thereof are formed aligned and superposed semicircular notches 100 and 101 respectively. The inner ends of the straps or conducting strips 74 and 75 are aligned with and overlie the notches 100 and 101 respectively. The preionizing device is disposed within notches 100 and 101 and between the inner ends of straps 74 and 75. Straps 74 and 75 are relatively thin punched metallic elements which have enough inherent resiliency whereby when the various components of the preionizing device are assembled together the preionizing device can be conveniently snapped into position between the inner ends of the straps 74 and 75.

The preionizing device comprises two capacitors 102, a resistor 103, an electrical insulating material spacer 104, and two metallic bell or cup-shaped elements 105 which together with the spacer 104 provide the pair of spaced insulated corona producing electrodes 106 and the pair of arc producing air spaced electrodes 107 illustrated in Fig. 9.

The capacitors 102 have cup-shaped configurations and may be made from a composition comprising barium titanate and about 20% clay or other suitable electrical insulating material having a relatively high dielectric constant. The outside surface of the bases of the capacitors 102 have metallic coatings 108 or the like thereon, and the open end edges of the capacitors 102 have metallic coatings 109 or the like thereon. The outside surfaces of the bases of the capacitors 102 have depressions 110 formed therein which cooperate with dimples 111 pressed into the inner ends of the straps 74 and 75 whereby the preionizing device is held securely in position.

The bell or cup-shaped elements 105 have integral crown or base portions 112, skirt or side wall portions 113 and 113' and out turned annular flange portions 114 adjacent the open end or mouth thereof. The resistor 103 is a well known form of commercial resistor having an outer electrical insulating material jacket 115 and relatively rigid terminal wires or leads 116 extending from opposite ends thereof.

The electrical insulating material spacer 104 has an aperture 117 formed in the central portion thereof and a particular external outline for a purpose to be discussed hereinafter. Spacer 104 has two generally parallel straight side edges 118. The front or outside edge 119 of spacer 104 has a convex or generally semi-circular arc-like configuration, and the back or inside edge 120 of spacer 104 has a concave or semi-circular arc-like configuration facing in a direction opposite to that of edge 119.

The radius of aperture 117 is slightly larger than the radius of cylindrical jacket 115 whereby spacer 104 can be slipped about the resistor 103. The elements 105 have central apertures 121 formed in the crown portions 112 thereof. Apertures 121 are large enough to permit passage of the leads 116 therethrough. The elements 105 are slipped over opposite ends of the resistor 103 until the flanges 114 butt up against the spacer 104. The terminals 116 are electrically connected to the crown portions 112 of elements 105 by solder 122 or the like.

The radius of the edge 119 and the perpendicular distance between the straight side edges 118 is greater than the outside radius of the flanges 114, whereas the radial distance from the center of aperture 117 to the center of edge 120 is less than the outside radius of flanges 114, whereby when the components 103 to 105 are axially assembled and aligned with respect to each other the flanges 114 will be spaced with respect to each other by spacer 104 except for in the region adjacent to the central portion of edge 120. Such construction in effect provides the insulated pair of corona emitting electrodes 106 and the arceous pair of air spaced electrodes 107 of Fig. 9. The capacitor elements 102 are slipped over the elements 105 until the coatings 109 engage the flanges 114. The dimensional relationship just described of the outer edges of spacer 104 with respect to the outer edges of the flanges 114 is also true with respect to the outer annular edges of the coatings 109. Also, the side walls 113 and 113' of elements 105 preferably are spaced from the cylindrical jacket 115 of resistor 103 to prevent leakage current between elements 105 along jacket 115.

As illustrated in Figs. 3 and 7, when the assembled preionizing device is inserted into grooves 100 and 101 between dimples 111 of straps 74 and 75 the preionizing device will also be positioned between mating bosses 51 and 54, and 52 and 55, along the left-hand side of main electrodes 14 and 15 respectively. The perpendicular distance between the side edges 118 of spacer 104 is slightly less than the shortest distance between mating bosses 51 and 54, and 52 and 55. Accordingly, side edges 118 will be positioned between said mating bosses and will prohibit the preionizing device from becoming misaligned with respect to the main spark gap 16. That is, the edge 120 of spacer 104 always faces main spark gap 16 since edges 118 will butt up against said mating bosses to prohibit rotation of the preionizing device.

The electrical circuit for the preionizing device is illustrated diagrammatically in Fig. 9. The voltage across the corona discharge gap defined by spacer 104 and electrodes 106 and across the arc discharge gap defined by air or other gas spaced electrodes 107 can be considerably less than the voltage required to produce corona at normal 60 cycle frequency voltage. At higher or abnormal frequency voltage the capacitance reactance of capacitors 102 decreases and the voltage across the resistor 103 and said corona and arc discharge gaps increases as a function of frequency. In this manner radio interference noise produced by the preionizing device at or below arrester rated voltage can be practically eliminated. At transient or surge voltage conditions the corona discharge gap emits copious quantities of corona which ionizes the arc discharge gap which in turn breaks down. The arced over air gap 107 then ionizes the main gap 16 which also arcs over. Such an arrangement makes for more consistent sparkover voltage of the main gap 16 inasmuch as the arc discharge air gap defined by electrodes 107 produces copious quantities of ions when it arcs over with which to ionize the main spark gap 16. Additional control over radio noise and main spark gap breakdown voltage consistency is obtained inasmuch as the preionizing means is built from individual components which can be manufactured with very close tolerances and quality control. As will be obvious to those skilled in the art, the preionizing device is usually adjusted so that at 60 cycle frequency air gap 107 will spark over at less than ½ of the sparkover voltage of main gap 16, and more probably closer to ⅓ of the sparkover voltage of main gap 16.

Referring now to Figs. 10, 10a, and 11, shown therein is a form of preionizing device similar to the form of preionizing device just described except that there is no air gap such as defined by electrodes 107 of Fig. 9. Said air gap is eliminated by eliminating the convex edge 120 of spacer 104 and making the edge 130 of spacer 131 identical to the edge 119 of spacer 104. Emission of corona in a direction towards the main gap 16 of Fig. 11 is assured by forming a pair of dimples 132 or the like in the flanges 114 adjacent to the main gap 16. The convex surfaces of dimples 132 are spaced closer to each other than any other portions of the flanges 114. Other parts of the preionizing device of Fig. 10 are constructed identically to the parts of the first described preionizing device. The just described preionizing device provides low radio noise and sparkover consistency due to frequency sensitivity and high quality control over the various elements thereof.

The form of preionizing device shown in Figs. 12 and 13 is similar to the second form of preionizing device shown in Figs. 10 and 11 except that the spacer 131 thereof has been omitted. Also, the outer diameter of the insulating jacket 115' of resistor 103 is made slightly larger than the inner diameter of side wall portions 113 of elements 105 whereby the side wall portions 113 fit snugly on the opposite ends of jacket 115'. This snug fit prohibits the elements 105 from moving with respect to each other and maintains the flanges 114 spaced from each other by a predetermined distance. However, the side wall portions 113' of the elements 105 are still spaced from the jacket 115' to minimize leakage current thereacross. This third form of preionizing means also provides low radio noise and sparkover consistency due to frequency sensitivity and high quality control over the various elements thereof.

It will be obvious to those skilled in the art that in each of the three described preionizing means two capacitors 102 are not absolutely essential to attain the benefits of our invention, but that a single capacitor unit 102 will suffice. However, by the use of two capacitor units 102 the devices are made very neat, compact, and symmetrical whereby they are very neatly and compactly integrated into the gap units 2. Additionally, it will occur to those skilled in the art that the benefits of our invention can be substantially obtained with other than capacitive and resistive components. For instance, it is within the scope of our invention to replace the resistance 103 by an inductance coil or the like whose impedance is substantially constant or less variable with respect to changes in frequency than capacitors 102 and to correlate said capacitors 102 and inductance coil to obtain the desired degree of frequency sensitivity. Additionally it is within the scope of this invention to replace the capacitors 102 by valve or non-linear resistance elements which would make the preionizer voltage sensitive as contrasted to frequency sensitive.

In Figs. 14 and 15 is illustrated a preionizing means which has only one capacitor unit, one of the gap unit electrical insulating material slabs comprising the dielectric for said one capacitor unit. The electrical circuit diagram of this preionizing means is equivalent to that illustrated in Fig. 9, less one capacitor. That is, this preionizing means has a parallelled resistor, corona discharge gap, and arc discharge gap. The gap unit of Figs. 14 and 15 is similar to that already described except that it has been modified to receive the particular preionizing means thereof.

Thus, the gap unit of Figs. 14 and 15 has electrical insulating material slabs 12' and 13'. Slightly inward of the central portion of the left-hand edge of slab 12' opposite to the main spark gap 16 is formed a circular bore or aperture 140. Also, slightly inward of the central portion of the left-hand edge of slab 13' opposite to the main spark 16 and in the inner or upper surface thereof is formed a circular blind bore, groove, or capacitor well 141. The capacitor well 141 has an inner bore diameter about equal to that of aperture 140, and is positioned immediately beneath and axially aligned with aperture 140. The bottom surface of the capacitor well 141 has a conducting paint 142 or the like thereon which comprises one of the capacitor plates.

Extending from the not shown outer bolt 17 of main electrode 14 along the outer or bottom surface of slab 13' to the bolt 57 which passes through the mating bosses 51 and 54 is a shorter conducting strap 75' instead of the longer conducting strap 75 heretofore described. An elongated strip of conducting paint 143 is applied to the outer or bottom surface of slab 13'. Paint strip 143 extends from the bolt 57 to a position directly opposite to the capacitor plate 142, and the lower end thereof when viewing Fig. 14 comprises another capacitor plate. The lower end of strap 75' when viewing Fig. 14 overlies the upper end of paint strip 143 and makes good electrical contact therewith.

Extending along the top or outer surface of slab 12' from the not shown outer bolt 20 of main electrode 15 to the bolt 58 and then towards the aperture 140 is a strap 74' similar to the heretofore mentioned strap 74. The upper end of strap 74' has a dimple 111' pressed therein. The axis of dimple 111' is axially aligned with the aperture 140 and blind bore 141 and its concave surface faces the blind bore 141. The strap 74' is a thin metallic punched part which is rigid enough to retain the other parts of the preionizing means disposed within the capacitor well 141 securely assembled therein, but still has sufficient inherent resiliency to permit easy insertion into and removal from the capacitor well 141 of said other parts.

Disposed within the aperture 140 and blind bore 141 between the strap 74' and the capacitor plate 142 is a metallic spring 144, a resistor 103 similar to that heretofore described, a metallic electrode element 145, an electrical insulating material spacer 146, and another metallic electrode element 147. The electrode element 147 has a dish or cup-shaped configuration with a flat base portion having a central aperture therein. Also, the electrode element 147 is inverted and positioned within the capacitor well 141 whereby its out-turned flange portion adjacent its open end makes good electrical contact with the capacitor plate 142. The maximum outer diameter of the electrode element 147 is slightly less than the bore diameter of capacitor well 141 whereby it just fits therein and will not move out of position. Also, the height of electrode element 147 is at least greater than the depth of capacitor well 141 whereby the spacer 146 can be readily assembled with the other parts of the preionizing means as will be more fully explained hereinafter.

The resistor 103 spans the strap 74' and the electrode element 147 and makes good electrical contact therewith. Thus, the upper terminal or rigid lead wire 116 of resistor 103 fits into the dimple 111' of strap 74'. The lower terminal or rigid lead wire 116 of resistor 103 extends through the aperture formed in the base portion of electrode 147 and is electrically connected to electrode 147 as by solder disposed on the underside of electrode 147 when viewing Fig. 15. The lower end of the electrical insulating material jacket of resistor 103 does not bottom against the electrode 147 but is spaced therefrom by a portion of the lower lead wire 116 by a distance slightly greater than the thickness of the spacer 146 whereby the spacer 146 will fit about said lower lead wire portion between the electrode 147 and said resistor jacket lower end.

The opposite and straight parallel side edges 148 of spacer 146 will cooperate with the mating bosses 51 and 54 and the not shown mating bosses 52 and 55 similarly to the heretofore described side edges 118 of spacer 104 to ensure that the insulated corona discharge and arc discharge air gaps of the preionizing means will always face the main spark gap 16. In the inner edge 149 of the spacer 146 is formed a V-shaped notch 150 which merges at its converging end with a straight blind notch 151 which terminates at the center or axis of the spacer 146. The notch 151 is wide enough to embrace the lower terminal lead 116 of resistor 103 and the V-shaped notch 150 diverges in a direction towards the main spark gap 16.

Surrounding the insulating jacket of resistor 103 and superposed over the spacer 146 is electrode element 145 which has an annular configuration. Formed on the upper surface of the annular electrode element 145 adjacent to the inner circumference thereof is a raised shoulder 152 which together with said upper surface provides a spring centering seat for the lower end of spring 144. The inner and outer circumferential surfaces of the annular electrode element 145 adjacent the lower end thereof are bevelled towards each other to define an annular portion 153 which has a tooth or V-like cross section which makes contact with the spacer 146. In no event does the electrode element 145 make electrical contact with the lower terminal lead 116 of the resistor 103. Otherwise, the electrode element 145 would be at the same electrical potential as electrode element 147.

The perpendicular distance between the side edges 148 of spacer 146 is greater than the maximum diametrical dimension of the electrode element 147 and the maximum diametrical dimension of the electrode element 145. The same is true of the perpendicular distance between the outer or front edge 154 of spacer 146 and inner edge 149. Accordingly, all portions of the electrode elements 145 and 147 are spaced from each other by the spacer 146 except in the vicinity of the notches 151 and 150 where they are spaced from each other by an air or other gas gap. This construction provides a paralleled insulated corona emitting and arceous air gap and resistor connected in shunt relationship through capacitive reactance with the main gap electrodes 14 and 15 similar in operation to the electrical circuit illustrated in Fig. 9.

The preionizing means of Figs. 14 and 15 can be assembled in the following manner. The electrode 145 is slipped about the resistor 103 which has previously been soldered to electrode 147. Then the strap 74' is deflected or moved out of obstructing relationship with respect to aperture 140. While gripping the assembly of electrode 147, resistor 103, and electrode 145 by the upper terminal lead 116 this three part assembly can be lowered through aperture 140 into capacitor well 141. Now the spacer 146 can be passed between the left-hand edges of slabs 12' and 13' and between the mating bosses 51 and 54, and 52 and 55, and slipped between the electrodes 145 and 147 about the lower terminal lead 116. The spacer 146 cannot be preassembled with the electrodes 145 and 147 and then passed through aperture 140 since in the illustrated form of the invention the spacer 146 is wider than the bore diameter of aperture 140. While the strap 74' is deflected or moved away from the upper terminal lead 116 the spring 144 can be inserted into aperture 140 about resistor 103 and seated on the spring centering seat provided on the upper end of electrode 145. When the strap 74' is moved into position whereby the dimple 111' seats on the upper terminal lead 116 the spring 144 is compressed whereby the spacer 146 is firmly gripped between electrodes 145 and 147 and retained from falling out of its illustrated final assembled position.

In Figs. 16 to 18 is illustrated another form of frequency sensitive preionizing means having a single capacitor, one of the insulating slabs of the gap unit comprising the dielectric material for said single capacitor. Also, in this form of invention the resistance element of the preionizing means is incorporated therein in a somewhat different manner.

The gap unit has insulating slabs 12" and 13" which are slightly modified to accommodate the particular form of preionizing means. In this instance the capacitor well is in the underside of slab 13" by forming blind bore 160 therein. The strap 75' mentioned with respect to Figs. 14 and 15 again extends to bolt 57, and another strap 75' extends from the not shown outer bolt 20 of main electrode 15 along the upper surface of slab 12" to the bolt 58. The interior surfaces of the blind bore 160 are covered with an electrical conducting paint 161 which comprises one plate of the capacitor. Capacitor plate 161 is electrically connected with the upper strap 75' when viewing Fig. 16 by a strip of electrical conducting paint 162 which extends from paint 161 to the vicinity of bolt 57 along the underside of slab 13".

Immediately opposite to the capacitor well 160 a circular area on the upper side of slab 13" having a diameter about equal to that of bore 160 is covered with an electrical conducting paint 163 which comprises the other plate of the capacitor as well as one electrode of an insulated gap and an air gap. Also painted or deposited on the upper side of slab 13" is a strip of electrical resistance material 164 which performs the functions of the heretofore discussed resistor 103. Said strip of resistance material 164 extends from capacitor plate 163 to the upper surface of boss 55 and the bolt 58. Thus, an electrical conducting path can be traced from the outer end of main electrode 14 through strap 75' and paint strip 162 to the capacitor comprising painted capacitor plates 161 and 163 having a portion of slab 13" therebetween. From capacitor plate 163 said path progresses along painted resistor strip 164, bolt 58, and strap 75' to the outer end of main electrode 15.

Disposed over the capacitor plate 163 is an electrical insulating material spacer 165 which has a V-shaped notch 166 formed in the inner edge thereof which diverges towards the main spark gap 16. Superposed over the spacer 165 is a flat metallic plate electrode element 167 which has a circular configuration. Bolted between the bosses 52 and 55 and in electrical contact with the painted resistance material 164 on boss 55 is a strap 168. This strap 168 is a thin metallic punched part and has a short web or rib 169 on the end thereof remote from the bolt 58. Web or rib 169 extends lengthwise of strap 168 and perpendicularly from the plane thereof. Rib 169 can be an integral portion of strap 168 or can be electrically connected thereto by welding or the like. The lower edge of web or rib 169 bears down on the upper surface of plate 167 and the strap 168 has sufficient inherent resiliency to thereby hold the spacer 165 and plate 167 in their illustrated positions.

By viewing particularly Fig. 16 it will be seen that the spacer 165 has sufficiently large dimensions whereby all portions of the capacitor plate or electrode 163 are spaced from all portions of the electrode 167 by the spacer 165 except in the vicinity of the notch 166 where electrodes 163 and 167 are spaced from each other only by air. Accordingly, this preionizing means also has a parallelled resistor, insulated corona discharge gap, and arc discharge air gap connected in shunt through capacitive reactance with the main electrodes 14 and 15. The operation of this single capacitor preionizing means is also identical to that heretofore described with respect to Fig. 9.

While there have been shown and described particular embodiments of the invention, it will be obvious to those skilled in the art that changes and modifications may be made without departing from the invention, and therefore it is intended by the appended claims to cover all such changes and modifications as fall within the true spirit and scope of the invention.

What we claim as new and desire to secure by Letters Patent of the United States is:

1. In combination, a main air gap defined by two air spaced metallic electrodes, a resistance element, a small air gap defined by two air spaced electrodes, a corona producing gap defined by two spaced electrodes having electrical insulating material therebetween and contacting the same, and a pair of capacitance elements, said resistance element, small air gap, and corona producing gap connected in parallel, and said parallel connected element, small air gap and corona producing gap connected in parallel with said main air gap through said pair of capacitance elements, said corona producing gap emitting corona at a voltage below the sparkover voltage of said small airgap and said small air gap sparking over at a voltage below the sparkover voltage of said main air gap, said three gaps being aligned with each other and said small air gap being positioned between the other two gaps.

2. In a main spark gap which is defined by a pair of main spaced electrodes and has a parallel auxiliary gap and resistor connected in shunt therewith through a pair of capacitors, said capacitors comprising two spaced cup-shaped elements having their open ends facing each other and spaced fom each other, the other ends of said capacitors being electrically connected to said main electrodes, a pair of spaced cup-shaped electrode elements disposed within said cup-shaped capacitor elements and having their open ends facing each other in spaced relationship to define said auxiliary gap, said resistor having an insulating material jacket thereon, said resistor disposed within said cup-shaped electrode elements and connected at its opposite ends to the bases of said cup-shaped electrode elements, and said auxiliary gap disposed closely adjacent to said main gap for preionizing said main gap at a voltage below the sparkover voltage thereof.

3. A preionizer comprising two high dielectric constant electrical insulating material spaced cup-shaped capacitance elements having their open ends facing each other, a pair of spaced cup-shaped metallic electrode elements disposed within said capacitor elements and having their open ends facing each other, the open ends of said electrode elements having out turned flanges thereon engaging the open end edges of said capacitance elements, said flanges being spaced from each other, and a rigid resistance element disposed within said electrode elements and connected at its opposite ends to said electrode elements adjacent the base portions thereof.

4. An auxiliary spark gap device for a main spark gap comprising a pair of cup-shaped electrical insulating material capacitance elements having their open end edges facing each other in spaced relationship, a pair of cup-shaped metallic electrode elements disposed within said capacitance elements and having their open end edges facing each other in spaced relationship, said electrode elements having an out turned flange on the open end edges thereof in contact with the open end edges of said capacitance elements, said flanges spaced from each other only by a gas medium, a rigid resistance element disposed within said electrode elements and connected at its opposite ends to said electrode elements adjacent the base portions thereof for retaining said flanges spaced with respect to each other, and two opposite portions of said flanges disposed closer to each other than any other portions of said flanges.

5. An auxiliary spark gap device for a main spark gap comprising a pair of cup-shaped electrical insulating material capacitance elements having their open end edges facing each other in spaced relationship, a pair of cup-shaped metallic electrode elements disposed within said capacitance elements having their open end edges facing each other in spaced relationship, said electrode elements having an out turned flange on the open end edges thereof in contact with the open end edges of said capacitance elements, said flanges entirely spaced from each other by solid electrical insulating material, a rigid resistance element disposed within said electrode elements and connected at its opposite ends to said electrode elements adjacent the base portions thereof, and two opposite portions of said flanges disposed closer to each other than any other portions of said flanges.

6. A preionizing device comprising a pair of oppositely facing cup-shaped electrical insulating material elements spaced from each other at their open ends, a pair of oppositely facing bell-shaped metallic elements spaced from each other at their open ends and disposed within said insulating material elements, said metallic elements having out turned flanges adjacent the open ends thereof abutting the open ends of said insulating material elements, said flanges spaced from each other by an electrical insulating material spacer, and a resistance element positioned within said metallic elements and connected at its opposite ends to said metallic elements.

7. In a lightning arrester comprising a pair of electrical insulating material slabs having a pair of main electrodes therebetween spaced from each other by a main air gap, frequency sensitive means for ensuring consistent sparkover of said main air gap comprising a parallel connected resistance/unit and preionizing gap connected in shunt with said main air gap through a pair of capacitance elements, said capacitance elements comprising a pair of electrical insulating material cup-shaped members having their open ends facing each other in spaced relationship, a pair of metallic bell-shaped electrode members having their open ends facing each other in spaced relationship and defining said preionizing gap, said bell-shaped members disposed within said cup-shaped members, the open ends of said bell-shaped members having out turned portions thereon engaging the open end edges of said cup-shaped members, said resistance unit disposed within said bell-shaped members and connected at its opposite ends to portions of said bell-shaped members, a pair of notches formed in said slabs opposite to said main air gap, said frequency sensitive means positioned in said notches, and said preionizing gap facing said main gap.

8. In a lightning arrester comprising a pair of spaced slabs of electrical insulating material having a pair of main electrodes therebetween spaced by a main spark gap, frequency sensitive means for ensuring consistent sparkover of said main spark gap comprising a pair of high dielectric constant electrical insulating material hollow cylindrical members each open at one end and closed at the other end thereof, said members having their open ends facing each other in spaced relationship, a pair of metallic hollow cylindrical members each open at one end and closed at the other end thereof, said metallic members positioned within said insulating material members and having their open ends facing each other, the open ends of said metallic members having radially outward extending flanges therein engaging the open ends of said insulating material members, said flanges spaced from each other by an electrical insulating material spacer, and a resistance element disposed within said metallic members, said resistance element extending through a central aperture formed in said spacer and connected at its opposite ends to the closed ends of said metallic members, the opposite facing surfaces of said slabs each having a projecting boss thereon adjacent a same side of each of said main electrodes, the bosses on one of said slabs abutting the bosses on the other of said slabs, said frequency sensitive means positioned between said two pair of abutting bosses, and said spacer having a width slightly less than the shortest distance between said two pair of abutting bosses.

9. A frequency sensitive preionizing device for a main lightning arrester air spark gap for ensuring consistent sparkover thereof, said preionizing device comprising a substantially frequency constant impedance, an auxiliary arc discharge air spark gap, and an insulated corona discharge gap defined by a pair of electrodes spaced from each other by an electrical insulating material spacer, said impedance, auxiliary air gap, and insulated gap connected electrically in parallel with each other and said paralleled impedance, auxiliary air gap, and insulated gap connected electrically in shunt with said main air gap through a substantially frequency variable impedance, said preionizing device comprising two oppositely disposed metallic members having an electrical insulating material spacer therebetween, said spacer having a notch formed in an edge thereof whereby all opposite facing portions of said oppositely disposed metallic members are spaced from each other by said spacer except in the vicinity of said notch where opposite facing portions of said oppositely disposed metallic members are spaced from each other by an air gap, said notched edge facing said main air gap, said insulated gap emitting corona at a voltage less than the sparkover voltage of said auxiliary air gap for preionizing said auxiliary air gap, and said auxiliary air gap sparking over at a voltage less than the sparkover voltage of said main air gap for preionizing said main air gap.

10. In a spark gap unit comprising two metallic electrodes aligned with respect to each other along an identical line and spaced with respect to each other at their inner ends to define a spark gap therebetween, said electrodes positioned between two spaced superposed slabs of electrical insulating material, a frequency sensitive spark gap preionizing means for ensuring consistent sparkover of said spark gap, said means comprising an electrically parallel connected resistor and auxiliary gap connected electrically in shunt relationship with said spark gap through a capacitor, said auxiliary gap being positioned closely adjacent said spark gap, said capacitor comprising a blind bore formed in one surface of one of said slabs adjacent to said spark gap, and a conducting material positioned on the bottom surface of said blind bore and on the opposite surface of said one slab opposite to said bottom surface conducting material.

11. In a spark gap unit comprising two main metallic electrodes spaced with respect to each other to define a main spark gap therebetween, said electrodes positioned between two spaced superposed slabs of electrical insulating material, a frequency sensitive spark gap preionizing means for ensuring consistent sparkover of said spark gap, said means comprising a blind bore formed in the inner surface of one of said slabs adjacent said spark gap, a conducting coating deposited on the bottom surface of said blind bore and on the outside surface of said one slab opposite to said bottom surface conducting coating, said outside surface conducting coating electrically connected to one of said electrodes, an auxiliary electrode concentrically positioned within said bore in electrical contact with said bottom surface conducting coating, said auxiliary electrode having a height greater than the depth of said bore, a through aperture formed in the other of said slabs opposite to said blind bore, a substantially rigid resistor having an electrical insulating material jacket rigidly connected to a central portion of said auxiliary electrode and extending therefrom concentrically through said through bore, an annular auxiliary electrode disposed about said electrical insulating material jacket and slightly spaced at one end thereof from said blind bore positioned auxiliary electrode by an electrical insulating material spacer, the other end of said annular electrode and resistor element electrically connected to the other main electrode.

12. A preionizing device for a main air spark gap defined by two spaced metallic main electrodes positioned between two spaced superposed electrical insulating material slabs comprising a blind bore formed in the inner surface of one of said slabs, a conducting paint on the bottom surface of said blind bore and on the outside surface of said one slab opposite to said bottom surface conducting paint, a first auxiliary electrode concentrically positioned within said blind bore in electrical contact with said bottom surface conducting paint, said first electrode having a height greater than the depth of said blind bore, a resistance element enclosed within a substantially rigid cylindrical electrical insulating material jacket having two substantially rigid terminal leads extending from opposite ends thereof, one of said leads connected to a central portion of said first electrode and said jacket extending concentrically through a bore formed in the other of said slabs immediately opposite to said blind bore, an annular auxiliary electrode disposed about said jacket and spaced at one end thereof from said first electrode by an electrical insulating material spacer disposed about said one lead, said spacer having an edge thereof facing said main spark gap having a notch therein extending from said edge to said one lead, said spacer having a peripheral outline whereby all opposite facing portions of said auxiliary electrodes are spaced from each other by said spacer except in the vicinity of said notch where opposite facing portions of said auxiliary electrodes are spaced only by an auxiliary air spark gap, a resilient conducting strap engaging the other of said leads and a spring surrounding said jacket, said spring at opposite ends thereof engaging said strap and the other end of said annular electrode, said strap adapted to be electrically connected to one of said main electrodes and said outside surface conducting paint adapted to be electrically connected to the other of said main electrodes.

13. In a spark gap unit having a main arc spark gap defined by a pair of spaced electrodes positioned between two spaced superposed electrical insulating material slabs, means for preionizing said main spark gap to ensure consistent sparkover voltage levels therefor comprising a blind bore formed in the outer surface of one of said slabs adjacent said main gap, a conducting paint deposited on the bottom surface of said bore and on the inner surface of said one slab opposite to said bottom surface conducting paint, a strip of electrical resistance material paint extending from said inner surface conducting paint along said inner surface, an electrical insulating material spacer having a notch formed in one edge thereof extending inwardly thereof, one side of said spacer in contact with said inner surface conducting paint, and a flat metallic disc in contact with the other side of said spacer, said spacer having an external configuration and so disposed with respect to said inner surface conducting paint and disc whereby all opposite facing portions of said inner surface conducting paint and disc are spaced by said spacer except in the vicinity of said notch where said opposite facing portions are spaced by an air gap, means electrically connecting said disc with the end portion of said strip opposite to said inner surface conducting paint, and said notch facing said main spark gap.

14. In a lightning arrester gap unit having a pair of opposed spaced main electrodes and two rows of opposed spaced auxiliary electrodes positioned on one side of said main electrodes, magnetic means for producing a magnetic field transverse to the inner ends of said main and auxiliary electrodes for driving an electrical arc initially struck between the inner ends of said main electrodes across said auxiliary electrodes for elongation and division thereof into a plurality of arc, magnetic means for producing a reverse magnetic field transverse to the outer ends of said main and auxiliary electrodes for limiting movement of said plurality of arcs towards the outer ends of said main and auxiliary electrodes, the terminals for said gap unit located adjacent the outer ends of said main electrodes and said auxiliary electrodes comprising a continuous strip of metal bent at its central portion into a narrow U-shaped configuration, the bent central portions of said auxiliary electrodes comprising the outer ends thereof, and said continuous strip having an oxide film thereon.

15. In a lightning arrester gap unit having a pair of opposed main electrodes and two rows of opposed auxiliary electrodes positioned on one side of said main electrodes, and a last auxiliary electrode having a length of about twice the length of one of said auxiliary electrodes, said last electrode positioned along the end of said rows most remote from said main electrodes, said row auxiliary electrodes comprising a continuous strip of metal bent at its central portion into a narrow U-shaped configuration having the legs thereof electrically insulated from each other by an oxide film, said bent central portions comprising the outer ends of said row auxiliary electrodes, said last electrode comprising an oxide coated continuous strip of metal bent over upon itself at points disposed at about ¼ and ¾ of the total length thereof, the central portion of said last electrode strip being generally straight and the opposite ends of said last electrode strip extending from said ¼ and ¾ points towards each other generally parallel to said central portion, the endmost portions of said opposite ends spaced from each other, and said opposite ends positioned between said central portion and said remote end.

16. In a lightning arrester having a pair of main electrodes spaced from each other at their inner ends, and a plurality of pairs of auxiliary electrodes spaced from each other at their inner ends and disposed along a same side of said main electrodes, said main and auxiliary electrodes spaced from each other along their sides, an additional auxiliary electrode positioned along the pair of said auxiliary electrodes most remote from said main electrodes, said additional electrode positioned on the side of said remote pair furthest removed from said main electrodes and spaced therefrom, said additional electrode comprising an oxide coated continuous strip of metal having the opposite end portions thereof bent towards each other at portions disposed at about ¼ and ¾ of the total length of said strip, the central portion of said strip between said bent ¼ and ¾ portions being generally straight and said opposite end portions extending towards each other generally parallel to said central portion, the endmost portions of said opposite end portions spaced from each other.

17. An electrode construction comprising an oxide coated continuous strip of metal bent over upon itself at points disposed at about ¼ and ¾ of the total length thereof, the central portion of said strip between said points being substantially straight, the opposite end portions of said strip extending from said points towards but short of each other, said opposite end portions having a central furrow formed therein extending the length thereof, the concave surfaces of said furrows facing said central portions.

References Cited in the file of this patent

UNITED STATES PATENTS

| | | |
|---|---|---|
| 1,477,303 | Allcutt | Dec. 11, 1923 |
| 1,477,304 | Allcutt | Dec. 11, 1923 |
| 1,477,307 | Allcutt | Dec. 11, 1923 |
| 1,531,971 | Peek | Mar. 31, 1925 |
| 2,392,679 | MacCarthy | Jan. 8, 1946 |
| 2,623,197 | Kalb | Dec. 23, 1952 |
| 2,644,116 | Olsen | June 30, 1953 |
| 2,677,794 | Gutterman | May 4, 1954 |